United States Patent [19]

Chen

[11] Patent Number: 5,290,643

[45] Date of Patent: Mar. 1, 1994

[54] BATTERY TEMPERATURE DETECTING DEVICE FOR A CHARGER

[75] Inventor: Stephen Chen, Changhua City, Taiwan

[73] Assignee: E Lead Electronic Co., Ltd., Changhua, Taiwan

[21] Appl. No.: 54,014

[22] Filed: Apr. 29, 1993

[51] Int. Cl.[5] .................. H01M 10/48; H01M 10/46
[52] U.S. Cl. ............................. 429/61; 429/93; 320/2; 320/36
[58] Field of Search ............. 429/61, 93; 320/35, 320/36, 2

[56] References Cited

U.S. PATENT DOCUMENTS

| | | | |
|---|---|---|---|
| 3,546,024 | 12/1970 | Niklas | 429/61 |
| 4,289,836 | 9/1981 | Lemelson | 429/61 |
| 5,185,564 | 2/1993 | Miller | 320/2 |
| 5,214,370 | 5/1993 | Harm et al. | 320/35 |

Primary Examiner—John S. Maples
Attorney, Agent, or Firm—Browdy and Neimark

[57] ABSTRACT

A battery temperature detecting device adapted particularly for a charger can monitor the variation of temperature of a charged battery and the detected is transmitted immediatedly to an internal circuit of the charger. The present detecting device is equipped with a shell, a heat sensitive sensor disposed is the shell and coupled to the internal circuit of the charger, and a fixing member which can firmly attach the detecting device to the surface of a charged battery whereby the heat sensitive sensor can pick up the variation of temperature of the battery and the same is delivered by wire to the internal circuit of the charger.

5 Claims, 6 Drawing Sheets

BATTERY TEMPERATURE DETECTING DEVICE FOR A CHARGER

BACKGROUND OF THE INVENTION

The present invention relates to a battery temperature detecting device which is attached directly to the surface of a charged battery so as to permit a heat sensitive sensor to pick up the variation of temperature of the battery and the same is transmitted to an internal circuit of the charger.

Generally, the conventional chargers available in consumers' markets are equipped with different kinds of detecting means to check if a charged battery is electrically saturated. The prevalent art adopted in most conventional chargers is based on the fact that if a charged battery becomes saturated, the voltage thereof will drop rather than continuously rise even more electric energy is still charged thereinto; this is so called "$-\Delta V$" feature. This feature is effectively used to detect the condition of a charged battery.

This "$-\Delta V$" art is put into effect by first recording the voltage of a battery at time T1 and then recording the voltage thereof at consecutive time T2, afterwards, the recorded voltages are put into comparison, if the result indicates the latter voltage is smaller than the former, it stands for the battery having been fully, charged, and the charger is made to stop. To some special batteries, the voltage drop $-\Delta V$ is too small to be easily detected, so the application of this art thereto becomes incapable, frequently resulting in the damage of batteries from electrical overcharge.

All the available rechargeable batteries have a common feature, i.e., whenever a battery is saturatedly charged, continuous charge will not raise the voltage of the battery afterwards, and the excessive electric energy is only converted into thermal energy or heat, resulting in the gradual rising of tempeature in the battery. So the heat in the battery can be used as a detected factor to determine whether a battery is charged to saturation. This feature can be applied solely or along with the $-\Delta V$ art to better detect the saturation of a charged battery in order to fully protect the same from damage by excessive heat generated from overcharge or can prevent the battery from undercharge.

However, the battery temperature detecting devices of the prior art or the present invention must all be equipped with a heat sensitive sensor such as a thermistor or the like. The disposition of the heat sensitive sensor is critical to the quality of a battery temperature detecting device, and an improper location of the thermal sensor will often result in false detection of the operation temperature of a battery. For instance, a motion telephone is equipped with a high power charger the inner circuit of which is apt to dissipation of large amount of heat during charge operation, causing the interior and superficial temperature of the charger much higher than the charged battery itself. In that case, the detected temperature variation of the battery is not correct at all and the internal circuit of the charger is often mistakenly actuated.

To solve the preceedingly cited problem, the heat sensitive sensor can be disposed directly in the interior of a battery and is associated with the inner circuit of the charger via a T terminal when the battery is being charged so as to enable the heat sensitive sensor to truly reflect the temperature of the battery. But so produced battery is relatively expensive and is not well adapted to other kinds of charger.

SUMMARY OF THE INVENTION

Therefore, the primary object of the present invention is to provide a battery temperature detecting device which is simple in structure, cheap to produce and can be equipped with proper heat sensitive sensor which is associated with the inner circuit of a charger so as to correctly reflect the temperature variation of a charged battery which can be used to control the associated charger to continue or to stop a charging operation, preventing the battery from either overcharge or undercharge.

DETAILED DESCRIPTION OF THE PREFERRED EMBODIMENTS

Figure 1:
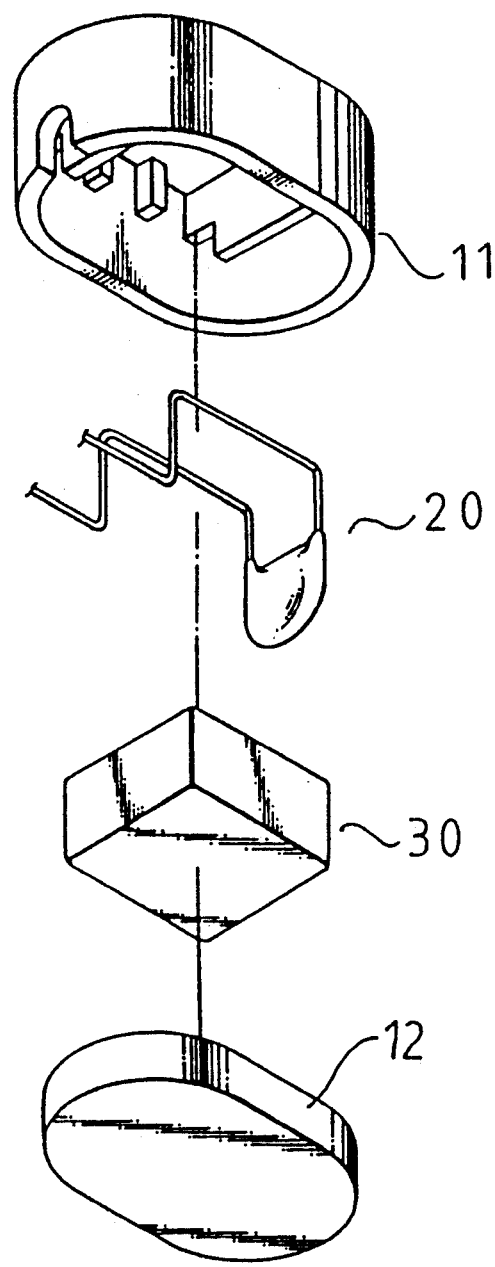
FIG. 1 is a perspective diagram showing the exploded components of the present invention.
Figure 2:
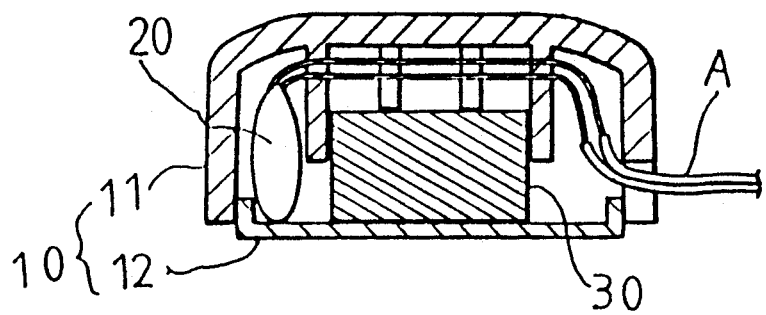
FIG. 2 is a sectional diagram of the present invention.
Figure 3:
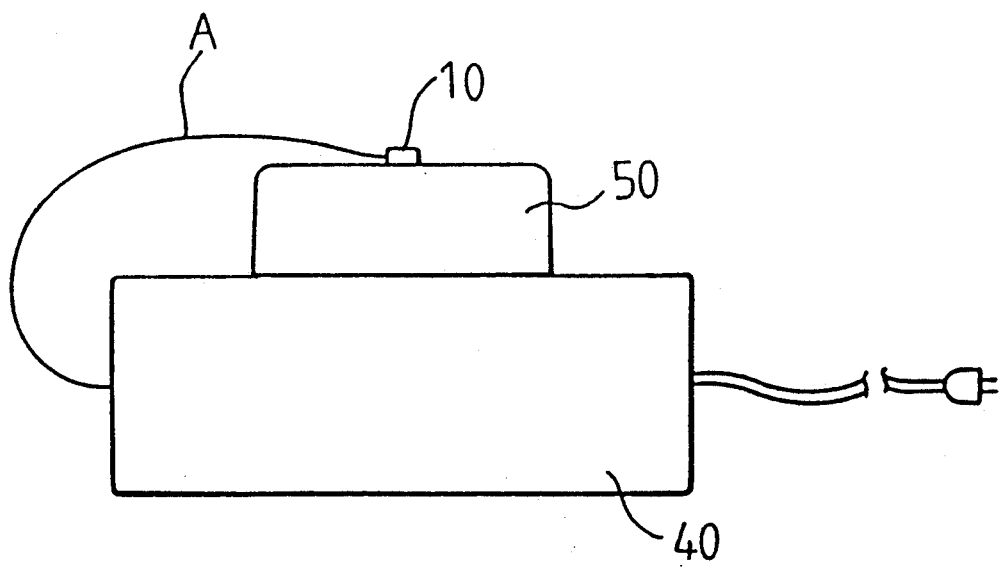
FIG. 3 is a plane diagram showing the application of the present invention to a charged battery.

Referring to FIGS. 1,2,3, the battery temperature detecting device of the present invention is comprised of a case 10, a heat sensitive sensor 20, a fixing unit 30. The case 10 has an upper shell 11 and a bottom lid 12 that are in engagement with each other. The upper shell 11 is preferrably made of material with low thermal conductivity, and the bottom lid 12 is made of material with good thermal conductivity, such as metal.

The heat sensitive sensor 20 is disposed in the case 10 and is coupled by wire A to an inner circuit of the charger so that the detected temperature by the heat sensitive sensor 20 can be delivered to the inner circuit of the charger 40.

Figure 4:
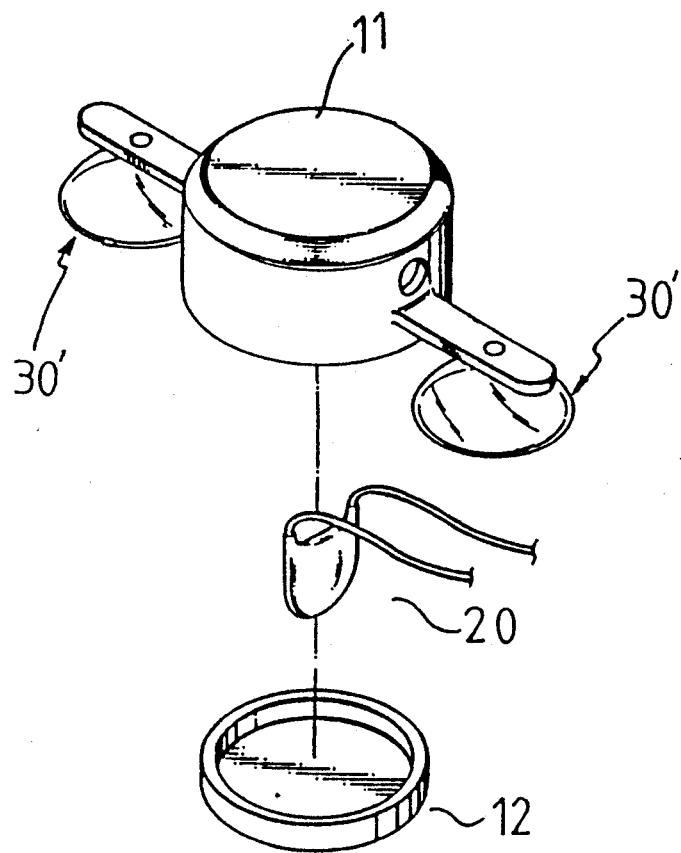
FIG. 4 is a perspective diagram showing the exploded components of the first embodiment thereof.
Figure 5:
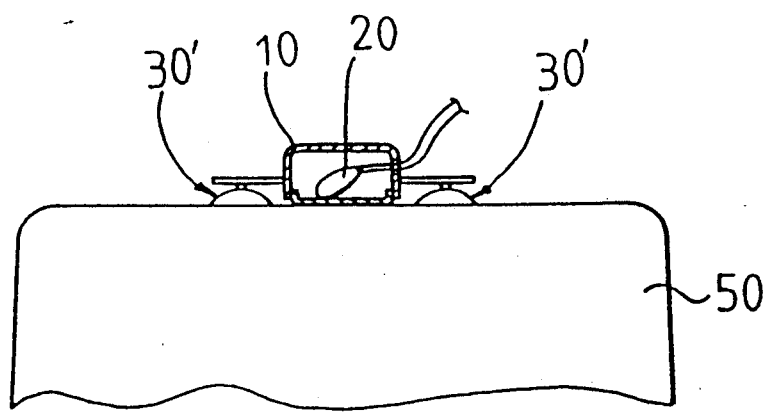
FIG. 5 is a sectional view of the application of the first embodiment of the present invention to a battery.
Figure 6:
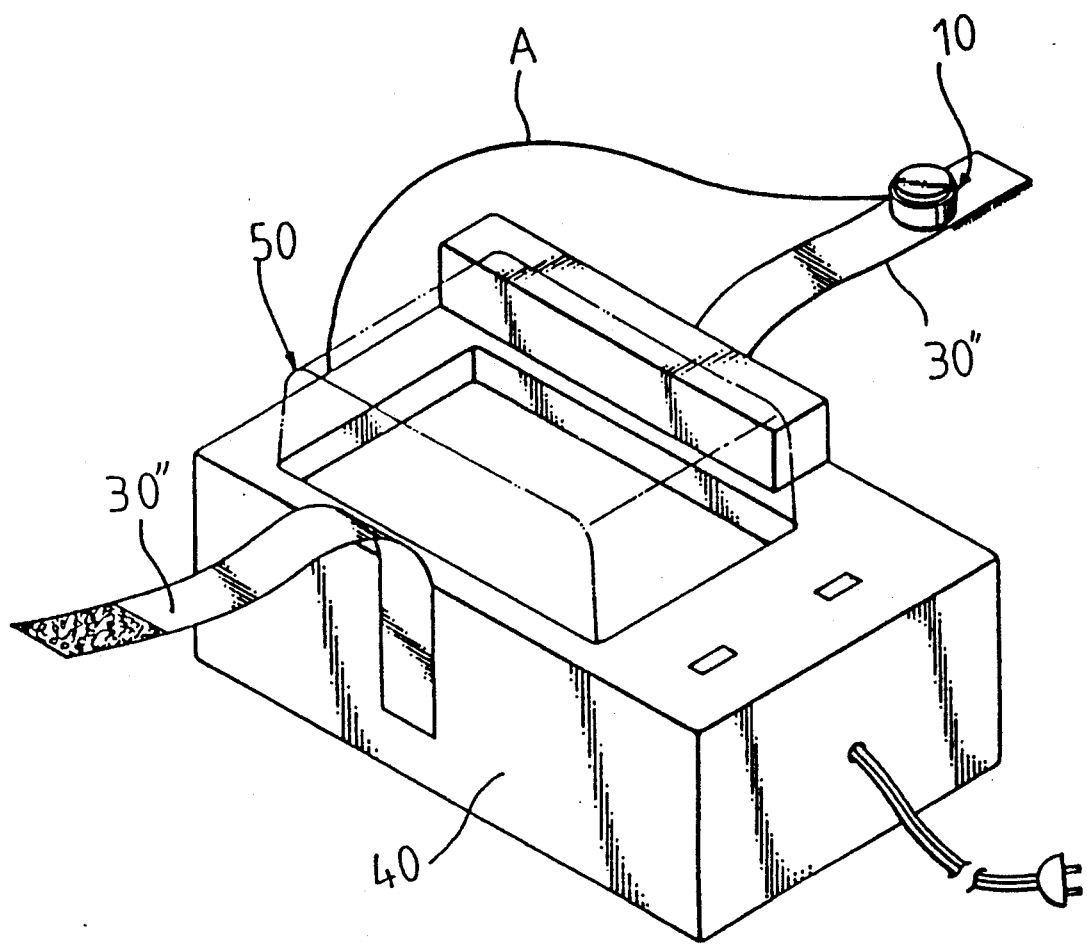
FIG. 6 is a perspective diagram showing the second embodiment of the present invention.
Figure 7:
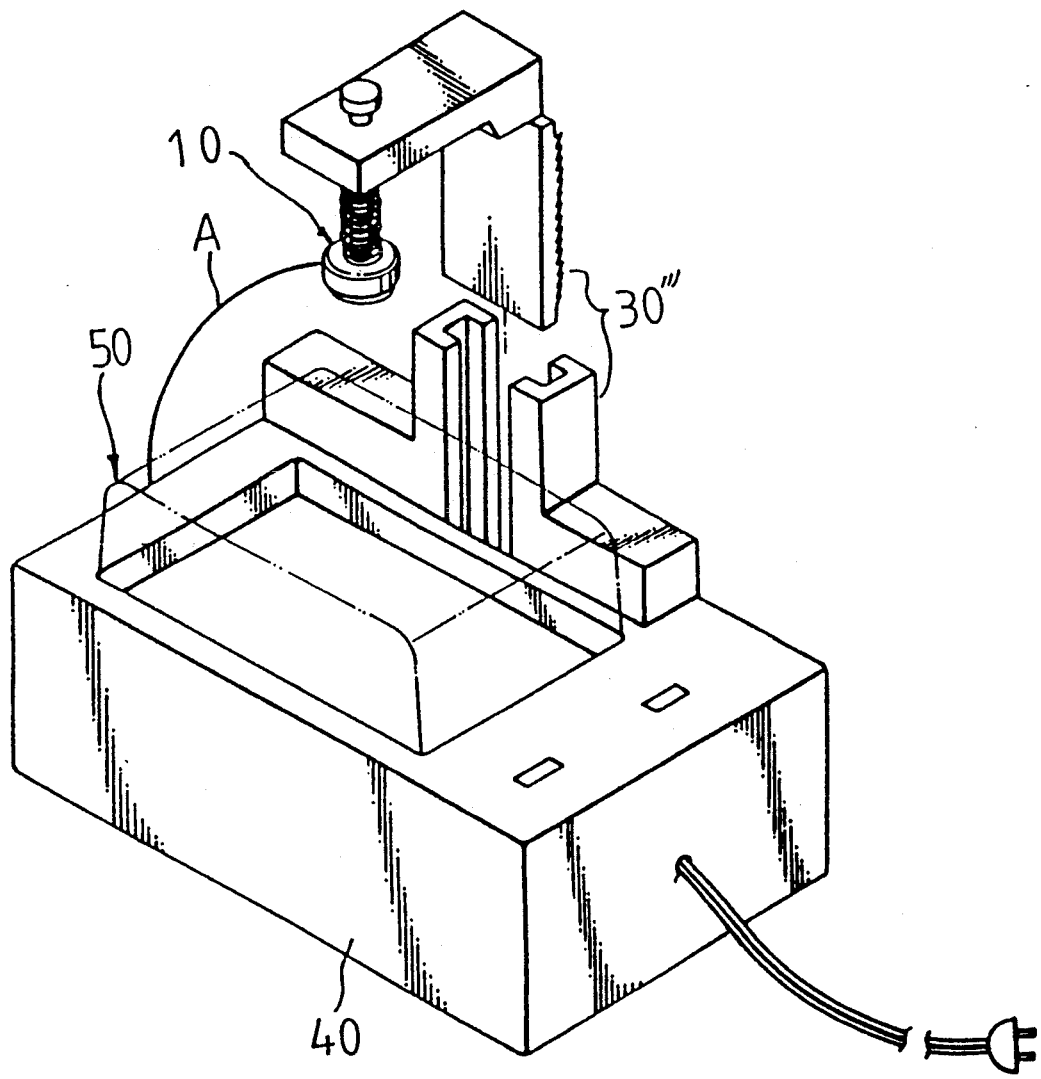
FIG. 7 is a diagram showing the application of the third embodiment to a battery.

Inside or outside the case 10 is disposed the fixing unit 30; or the fixing unit 30 can be attached directly to the exterior of the charger so as to permit the whole case 10 to be mounted unto the battery 50 which is being charged with the part having good thermal conductivity in close contact with the surface of the battery 50. The fixing unit 30 can be designed in many forms. For instance, the fixing unit 30 shown in FIGS. 1, 2, is a magnet disposed inside the case 10. The fixing unit 30 as shown in FIGS. 4, 5, is a sucking disc disposed at each side of the case 10; and the fixing unit 30 as shown in FIG. 6 is a fastening belt attached to the sides of a charger 40; and the fixing unit 30 as shown in FIG. 7 is a pressing slab disposed at one side of a charger 40.

In practical operation, the present battery temperature detecting device having a heat sensitive sensor 20 disposed in the case 10 is directly secured, by one of the various fixing units 30, to a battery 50 with the bottom lid 12 having relatively good thermal conductivity in tight abutment against the surface of the battery 50, enabling the heat sensitive sensor 20 to precisely detect the temperature variation in the battery 50. Since the other part of the case 10 is made of thermally insulating material, the heat generated in the charged battery can be confined in the case 10 and detected by the heat sensitive sensor 20 so that the inner circuit in the charger 40 can detect if the charged battery is saturated and respond properly to protect the battery from being overcharged or undercharged.

I claim:

1. A battery temperature detecting device for use on a charger, comprising:

a case having an upper shell and a bottom lid;

said bottom lid in abutment against said battery being made of material having good thermal conductivity;

said upper shell being made of material having low thermal conductivity;

a heat sensitive sensor disposed in said case being connected by wire to an inner circuit of said charger so as to transmit detected temperature to said inner circuit of said charger;

a fixing means being associated with said case or fixed to said charger for securing said case to said battery with said bottom lid having good thermal conductivity in abutment against the surface of said battery whereby said heat sensitive sensor can detect the temperature of said battery which is then transmitted to said inner circuit of said charger so as to cause said charger to continue or stop the charge operation according to the charging state detected by the temperature of said battery.

2. A battery temperature detecting device as claimed in claim 1 wherein said fixing means is a magnet.

3. A battery temperature detecting device as claimed in claim 1 wherein said fixing means is sucking discs.

4. A battery detecting device as claimed in claim 1 wherein said fixing means is a fastening belt or belts in association with said charger.

5. A battery temperature detecting device as claimed in claim 1 wherein said fixing means is an adjustable pressing slab in engagement with said charger.

* * * * *